L. G. GILGHRIST.
TIRE FILLER.
APPLICATION FILED SEPT. 8, 1916.
1,208,946.
Patented Dec. 19, 1916.
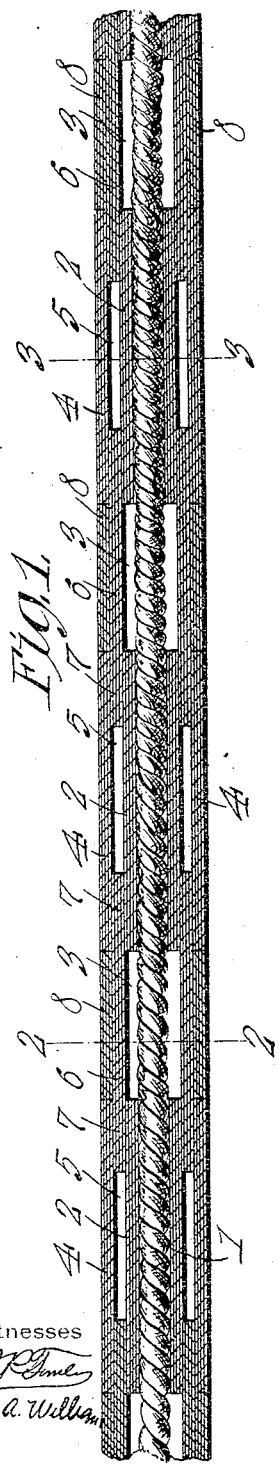
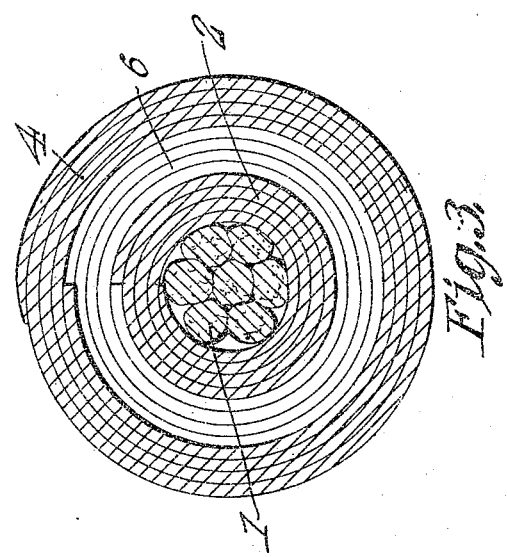
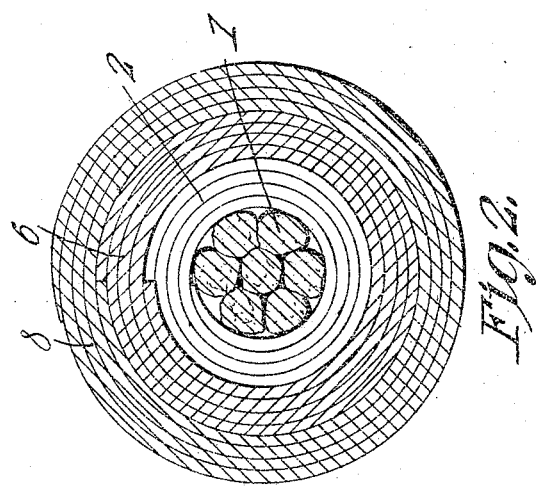
Lawrence G. Gilghrist
Inventor
Witnesses

UNITED STATES PATENT OFFICE.

LAWRENCE G. GILGHRIST, OF VANDERGRIFT, PENNSYLVANIA.

TIRE-FILLER.

1,208,946.

Specification of Letters Patent.

Patented Dec. 19, 1916.

Application filed September 8, 1916. Serial No. 119,142.

*To all whom it may concern:*

Be it known that I, LAWRENCE G. GILGHRIST, a citizen of the United States, residing at Vandergrift, in the county of Westmoreland and State of Pennsylvania, have invented a new and useful Tire-Filler, of which the following is a specification.

The device forming the subject matter of this application is a filler, adapted to be placed within a tire casing, thereby dispensing with the necessity of inflating the casing with air.

The invention aims to provide a tire filler which may be fashioned at trifling expense, the construction of the device being such that it will present unusual resiliency, combined with the necessary rigidity.

Another object of the invention is to provide novel means whereby the rings of the filler may be built up separately, the construction being such, however, that the rings will not tend to separate longitudinally of the structure.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings: Figure 1 shows in longitudinal section, a tire filler constructed in accordance with the present invention; Fig. 2 is a cross section on the line 2—2 of Fig. 1; and Fig. 3 is a cross section on the line 3—3 of Fig. 1.

In carrying out the invention there is provided a core 1 which may be made out of any desired material. The core 1 should possess some elasticity, and a rope may be used in forming the core, if desired. The core 1 is surrounded by inner rings 2 spaced from each other as shown at 3, longitudinally of the core. Outer rings 4 surround the inner rings 2, and are spaced from each other longitudinally of the core, like the inner rings, the outer rings being spaced from the inner rings transversely of the core, as indicated at 5. The invention comprises intermediate rings 6 which are spaced from each other longitudinally of the core, the ends 7 of the intermediate rings 6 being engaged between the ends of the inner rings 2 and the outer rings 4. Auxiliary rings 8 surround the central portions of the intermediate rings 6 and extend between the ends of the outer rings 4. The outer surfaces of the auxiliary rings 8 are flush with the outer surfaces of the outer rings 4, so that the filler, exteriorly, presents a continuous and unbroken surface.

In fashioning the inner rings 2, strips of material of a common width from side to side are wound closely around the core 1. These strips may be made of rubber, and old inner tubes, possibly, may be utilized. The intermediate rings 6 are then built up in a similar manner, by winding strips around the ends of the inner rings 2. The outer rings 4 are then wound in place, in a similar manner, and finally the auxiliary rings 8 are wound into place. The constituent convolutions of the various rings may be cemented together as the building up process progresses.

In the drawings, but three layers of rings have been shown, but it is to be understood that as many layers may be provided as is desired. The number of layers will be governed by the diameter which it is desired that the tire filler shall have, and the number of layers will also be governed by the thickness of the strips which are wound into place to make up the several rings.

The filler forming the subject matter of this application will be found to be peculiarly efficient, in that it is provided at intervals, longitudinally, with circumscribing spaces. The necessary rigidity will be afforded because of the fact that, at spaced intervals, longitudinally of the filler, there are no spaces, as Fig. 1 will clearly show.

Having thus described the invention, what is claimed is:—

A tire filler comprising a core; inner rings surrounding the core and spaced from each other longitudinally of the core; outer rings surrounding the inner rings and spaced from each other longitudinally of the core, the outer rings being spaced from the inner rings transversely of the core; intermediate rings spaced from each other longitudinally of the core and having their ends engaged between the ends of the inner and outer rings; and auxiliary rings surrounding the central portions of the intermediate rings and extended between the ends of the outer rings, and having their outer surfaces flush with the outer surfaces of the outer rings.

In testimony that I claim the foregoing as my own, I have hereto affixed my signature in the presence of two witnesses.

LAWRENCE G. GILCHRIST.

Witnesses:
E. H. BECHTEL,
M. N. FOWLER, Jr.

Copies of this patent may be obtained for five cents each, by addressing the "Commissioner of Patents, Washington, D. C."